United States Patent
Wegener et al.

(10) Patent No.: US 12,250,365 B2
(45) Date of Patent: Mar. 11, 2025

(54) TEST SETUP AND METHOD FOR TESTING A STEREO CAMERA

(71) Applicant: dSPACE GmbH, Paderborn (DE)

(72) Inventors: Tim Wegener, Paderborn (DE); Thomas Michalsky, Paderborn (DE); Jan Deppermann, Paderborn (DE)

(73) Assignee: DSPACE GMBH, Paderborn (DE)

( * ) Notice: Subject to any disclaimer, the term of this patent is extended or adjusted under 35 U.S.C. 154(b) by 22 days.

(21) Appl. No.: 18/169,893

(22) Filed: Feb. 16, 2023

(65) Prior Publication Data
US 2023/0269365 A1    Aug. 24, 2023

(30) Foreign Application Priority Data

Feb. 18, 2022  (DE) .......................... 102022103940.4

(51) Int. Cl.
| | | |
|---|---|---|
| *H04N 17/00* | (2006.01) | |
| *G06T 7/50* | (2017.01) | |
| *G06T 7/80* | (2017.01) | |
| *H04N 13/31* | (2018.01) | |
| *H04N 13/327* | (2018.01) | |

(52) U.S. Cl.
CPC ............. *H04N 17/002* (2013.01); *G06T 7/50* (2017.01); *H04N 13/31* (2018.05); *G06T 2207/30252* (2013.01)

(58) Field of Classification Search
CPC .... H04N 17/002; H04N 13/327; H04N 13/31; G06T 7/50; G06T 7/85
See application file for complete search history.

(56) References Cited

U.S. PATENT DOCUMENTS

| | | | | |
|---|---|---|---|---|
| 10,703,508 | B1* | 7/2020 | Mehnert | G06F 30/20 |
| 2006/0018509 | A1* | 1/2006 | Miyoshi | H04N 13/117 382/104 |
| 2006/0029256 | A1* | 2/2006 | Miyoshi | H04N 13/254 382/104 |
| 2009/0116732 | A1* | 5/2009 | Zhou | H04N 13/261 348/42 |
| 2015/0334380 | A1* | 11/2015 | Kim | H04N 13/327 348/54 |
| 2016/0189358 | A1* | 6/2016 | Boufarguine | H04N 13/128 348/50 |
| 2016/0241791 | A1* | 8/2016 | Narayanswamy | G01B 11/245 |
| 2018/0167609 | A1* | 6/2018 | Shen | G03B 15/03 |
| 2018/0316906 | A1* | 11/2018 | Nobori | H04N 13/275 |
| 2019/0236380 | A1* | 8/2019 | Fukuhara | G05D 1/0251 |
| 2020/0074716 | A1* | 3/2020 | Kaplan | H04N 13/344 |
| 2020/0342652 | A1* | 10/2020 | Rowell | G06V 10/82 |
| 2021/0004610 | A1* | 1/2021 | Huang | G01S 7/4814 |
| 2021/0056318 | A1* | 2/2021 | Saad | G05B 17/02 |

(Continued)

FOREIGN PATENT DOCUMENTS

DE    102020107802 A1    9/2021

*Primary Examiner* — Brian P Yenke
(74) *Attorney, Agent, or Firm* — LEYDIG, VOIT & MAYER, LTD.

(57) ABSTRACT

A test setup for testing a stereo camera for a vehicle includes: a computing unit; and an autostereoscopic screen. The computing unit is configured to generate synthetic image data and to output the synthetic image data on the autostereoscopic screen in such a way that the image data is detectable by the stereo camera as a stereo image.

11 Claims, 4 Drawing Sheets

O   distance
10  test setup
12  stereo camera
14  first lens
16  second lens
18  autostereoscopic screen
20  computing unit
22  simulator
24  combiner
B1  first image data set
B2  second image data set

30  surroundings
EGO vehicle
H1  obstacle
H2  obstacle
F1  further vehicle
F2  further vehicle
F3  further vehicle (56) References Cited

U.S. PATENT DOCUMENTS

| | | | |
|---|---|---|---|
| 2021/0185299 A1* | 6/2021 | Burian | H04N 13/133 |
| 2022/0227280 A1* | 7/2022 | Thieberger | B60R 11/04 |
| 2023/0199168 A1* | 6/2023 | Sauer | G05B 23/0256 |
| | | | 348/181 |
| 2023/0273301 A1* | 8/2023 | Engelbert | G01S 17/931 |
| | | | 356/4.01 |
| 2024/0144591 A1* | 5/2024 | Piskunov | H04N 13/00 |

* cited by examiner

| O | distance |
|---|---|
| 10 | test setup |
| 12 | stereo camera |
| 14 | first lens |
| 16 | second lens |
| 18 | autostereoscopic screen |
| 20 | computing unit |
| 22 | simulator |
| 24 | combiner |
| B1 | first image data set |
| B2 | second image data set |

Fig. 1

30 surroundings
EGO vehicle
H1 obstacle
H2 obstacle
F1 further vehicle
F2 further vehicle
F3 further vehicle

Fig. 3

Fig. 4 a  generating synthetic image data
b  outputting the synthetic image data on an autostereoscopic screen
c  detecting the image data, output on the screen, by the stereo camera as a stereo image

TEST SETUP AND METHOD FOR TESTING A STEREO CAMERA

CROSS-REFERENCE TO PRIOR APPLICATIONS

Priority is claimed to German Patent Application No. DE 102022103940.4, filed on Feb. 18, 2022, the entire disclosure of which is hereby incorporated by reference herein.

FIELD

The application relates to a test setup and a method for testing a stereo camera for a vehicle, and to a test bench for testing a vehicle with a stereo camera.

BACKGROUND

Vehicles with advanced driver assistance systems (ADAS), e.g., for autonomous or partially autonomous driving, can have various sensors for detecting the surroundings, such as, for example, radar sensors, ultrasonic sensors, LIDAR sensors, and/or cameras. A camera can be designed, for example, as a mono camera or stereo camera.

One possibility for testing sensors for vehicles is to test the corresponding sensors in the installed state during test runs. This is complex and cost intensive.

Test benches can support the development of driver assistance systems with the aid of, for example, functional tests for vehicle components such as, for example, control devices or sensors. The test benches simulate the operation of a vehicle or of vehicle components, such as sensors, under various environmental and usage conditions.

DE 202020107802 A1 proposes a test bench for testing a stereo camera device of a vehicle, wherein an image is projected onto a projection surface alternately via two image generating devices, said image, by actuating a shutter device and by opening/closing the shutter elements, being shared or blocked alternately for one of two cameras of the stereo camera device in each case.

SUMMARY

In an exemplary embodiment, the present application provides a test setup for testing a stereo camera for a vehicle. The test setup includes: a computing unit; and an autostereoscopic screen. The computing unit is configured to generate synthetic image data and to output the synthetic image data on the autostereoscopic screen in such a way that the image data is detectable by the stereo camera as a stereo image.

BRIEF DESCRIPTION OF DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Exemplary embodiments of the application further improve the testing of stereo cameras.

Exemplary embodiments of the application include a test setup and a method

A test setup for testing a stereo camera for a vehicle has a computing unit and an autostereoscopic screen, wherein the computing unit is configured to generate synthetic image data and to output said data on the autostereoscopic screen in such a way that the image data can be detected by the stereo camera as a stereo image.

Synthetic data are to be understood as data which are generated electronically by simulation. The synthetic image data thereby simulate surroundings of the vehicle as they would be optically detected by the stereo camera. The synthetic image data are then processed by the computing unit and output on the autostereoscopic screen such that the stereo camera placed appropriately in front of the autostereoscopic screen can optically detect the output image data as a stereo image, i.e., for example, as an image with a spatial impression and/or depth impression. The spatial impression is also referred to as a 3-D effect. The detected image data are in turn output by the camera as digital image data, e.g., as raw camera data, and can be appropriately re-used, e.g., for a functional test of the stereo camera and/or further vehicle components. Raw camera data refers to data which are output as digital data by an imager of the camera, wherein the imager processes optical information from the optics of the camera.

One advantage of the test setup can be that the stereo camera can be tested "over-the-air," i.e., via the interfaces which are provided anyway during operation. Said interfaces comprise, on the one hand, the image data optically detected via the camera and, on the other, the output data of the stereo camera. Thus, stereo cameras can be tested, as they are also installed in the vehicle, without having to provide and/or develop an additional interface specifically for the test. This is advantageous in particular for regular function control in the field during the lifetime of the vehicle (periodic technical inspection PTI).

The test setup also makes it possible to test stereo cameras for vehicle functions with tough real-time requirements. This relates, for example, to driving functions for autonomous or partially autonomous driving. Via the suitable generation of the image data and the suitable arrangement of the stereo camera, the autostereoscopic screen can be used for testing the stereo camera, and the image data for the two optics of the stereo camera can be output simultaneously while fulfilling tough requirements in terms of on-screen synchronicity.

In one embodiment of the test setup, the autostereoscopic screen is configured to generate a stereo effect on a pixel basis and via devices mounted on the screen surface. In this case, on the screen surface means that the devices are mounted between the screen and the stereo camera in the beam direction of the light, starting from the generated image points. This can mean that the devices are mounted on the outside of the screen or integrated into the screen between image point generation and stereo camera. The devices function on a pixel basis, i.e., they are configured such that they can act optically on the light emitted by individual pixels. Preferably, the devices act on groups of pixels, e.g., on perpendicular strips the width of a pixel. The devices are designed and arranged such that they act similarly on light emitted by pixels of such a group.

The devices are, for example, optical filter elements having one or more optically-active layers. In the case of an LCD screen, for example, said filter elements can be integrated into the screen or mounted in front of the screen. The optical filter elements can serve as beam splitters for the light exiting the screen, and thus create a spatial impression. The devices thus partition the various channels of the autostereoscopic screen. The spatial impression, i.e., the 3-D effect, can be created in that the image data are distributed by the optical filter elements to the various channels, wherein the channels are fixedly associated with pixels. The channels can, for example, be fixedly associated with a perpendicular strip, e.g., in the form of a perpendicular row of pixels, so that the perpendicular rows of pixels of the screen are associated alternately with the various channels of the stereo image. The perpendicular pixel strips can also be wider than one pixel.

In one embodiment, the autostereoscopic screen is configured to output the synthetic image data as first and second image data for the stereo image simultaneously. The first and second image data thus represent two views of a same scene, and are thus distributed to the pixels of the screen such that they each correspond to a channel of the autostereoscopic screen. Via the autostereoscopic screen, the output first and second image data are pixel-based and spatially separated via the devices mounted on the screen surface.

The devices can be optical filter elements which serve as beam splitters. The devices can be designed as lenticular grids, i.e., rasterized optical lenses, which appropriately redirect the light. The devices can be designed as parallax barriers, i.e., obliquely-positioned aperture grilles. The devices can be adapted to the resolution and size of the screen to achieve good spatial separation. The lenses of the lenticular grid can be adapted with respect to their refraction, number, and arrangement for good spatial separation. The parallaxes of the parallax barrier can be adapted with respect to their width, orientation, and their distance from the pixels for good spatial separation. The distance between the stereo camera and the autostereoscopic screen is also important for good spatial separation.

The first and second image data are generated by a simulator of the computing unit. In this case, the first and second image data preferably correspond to two channels of a stereo image, which can be composed to form a stereo image with a spatial effect and depth impression when perceived at two, spatially separate, observation points. The synthetic first and second image data in this case simulate a vehicle surroundings as would be optically detected by two, spatially separate lenses—the first and the second optics—of the stereo camera.

The first and second image data are processed and output on the autostereoscopic screen by a combiner of the computing unit such that the first optics of the stereo camera that are appropriately placed in front of the autostereoscopic screen can optically detect the output first image data, and the second optics of the stereo camera can optically detect the output second image data, and that the first and second image data optically detected by the stereo camera can be combined to form a stereo image. The combiner distributes the first and second image data to the pixels of the autostereoscopic screen in such a way that the simulated first image data of the first optics of the simulated stereo camera are output on a channel of the screen, and that the simulated second image data of the second optics of the simulated stereo camera are output on another channel of the screen.

Via the devices of the autostereoscopic screen, it is to be achieved here that the first optics detect the first image data, and not the second image data, and that the second optics detect the second image data, and not the first image data. For this purpose, the camera is advantageously arranged at the correct distance and at least approximately centrally to the autostereoscopic screen. The offset of the stereo camera with respect to the perpendicular bisector of the autostereoscopic screen should be as small as possible.

In one exemplary embodiment, the computing unit is configured to generate the synthetic image data using parameters of the real stereo camera that is to be tested. As a result, it can be achieved that the image data shown on the autostereoscopic screen correspond as far as possible to those which the real stereo camera would detect—preferably in the real or simulated surroundings of the vehicle. The parameters of the stereo camera can relate in particular to the field of view, the resolution, the installation position of the stereo camera in the vehicle, and/or the distance between the first and second optics.

In one embodiment, the stereo image represents a region of the vehicle surroundings, and depth information can be determined on the basis of the stereo image. Such a stereo image can be used for distance calculation, as used advantageously, for example, in applications such as adaptive cruise control or an emergency braking assistant.

In one embodiment, the computing unit is configured to generate the synthetic image data and to output said data on the autostereoscopic screen in such a way that depth information can be determined on the basis of the stereo image detected by the stereo camera. As a result, the distance calculation utilized for applications such as adaptive cruise control or an emergency braking assistant can, advantageously, be tested using a stereo camera.

In one embodiment, the synthetic image data simulate a detection of a region of a virtual surroundings of the vehicle by the stereo camera. As a result, it can be achieved that the image data shown on the autostereoscopic screen correspond as much as possible to those which would be detected by a real stereo camera in the real surroundings of the vehicle and or by a virtual stereo camera in the virtual surroundings of the vehicle.

In one embodiment, the test setup has an interface for receiving data which are dependent upon the image data detected by the stereo camera. This makes it possible, in the test setup, to receive and further process the image data detected by the stereo camera, which are output by the stereo camera as digital data—for example, as raw data.

A test bench for testing a vehicle with the stereo camera can have a test setup. For example, a functional test of vehicle components or vehicle functions which use the stereo camera can be carried out via such a test bench. Examples of such driving functions are adaptive cruise control or an emergency braking assistant, or further driving functions of autonomous or semi-autonomous driving.

Such a test bench also makes it possible to test components or functions of a vehicle additionally having further sensors, such as, for example, a radar sensor, an ultrasonic sensor, a further camera, and/or a LIDAR sensor. The test bench preferably has one or more further test setups configured to test the radar sensor, the ultrasonic sensor, the further camera, and/or the LIDAR sensor. The further camera can be a further stereo camera, which can then be tested via a test setup as described above. The further camera or an additional further camera can be a mono camera, such as, for example, a surround view camera or a front camera.

A method for testing a stereo camera has the following steps:
a) generating synthetic image data,
b) outputting the synthetic image data on an autostereoscopic screen,
c) detecting the image data, output on the screen, by the stereo camera as a stereo image.

In one embodiment of the method, the synthetic image data have first and second image data for the stereo image that are output simultaneously on the autostereoscopic screen. Preferably, the first and second image data are output offset relative to one another on the autostereoscopic screen.

In one embodiment of the method, the first image data are detected by first optics of the stereo camera, and the second image data are detected by second optics of the stereo camera.

The application is further explained and described in the following with reference to exemplary embodiments illustrated in the figures.

Figure 1:
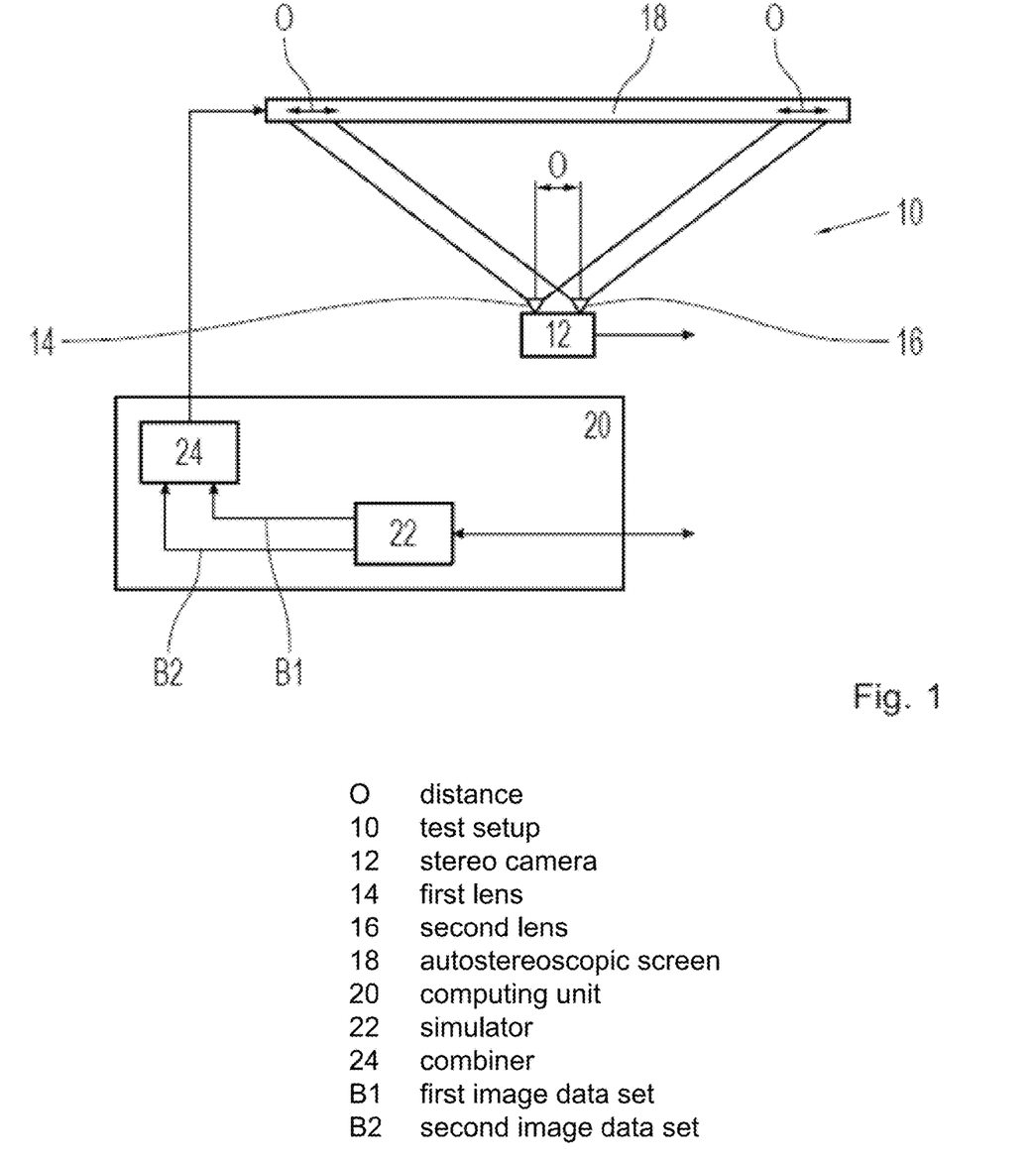
FIG. 1 schematically shows a test setup for testing a stereo camera.

FIG. 1 shows a test setup 10 for testing a stereo camera 12. The test setup 10 has a computing unit 20 and an autostereoscopic screen 18.

The stereo camera has a first lens 14 and a second lens 16 as optics. The two lenses 14, 16 are at a distance O from one another. The two lenses 14, 16 of the stereo camera each detect an object from a slightly different angle. This means that a slightly different image is detected in each case. These two images can, using the differences between the two images, be combined to form a stereo image, from which, for example, spatial depth information or distance information can be gathered.

A simulator 22 of the computing unit 20 is configured to generate synthetic first and second image data B1, B2. For this purpose, a simulation model is used that simulates the surroundings of the vehicle EGO with objects H1, H2, F1, F2, F3 in the surroundings. In the simulation model, the vehicle EGO has a virtual stereo camera. The virtual stereo camera has two virtual mono cameras which are at the same distance O from one another as the two lenses 14, 16 of the stereo camera. The two virtual mono cameras can also be parameterized in the simulation model such that they reproduce the stereo camera as precisely as possible. In addition to the distance O, the parameters can relate, for example, to the field of view of the stereo camera 12, its resolution, and/or its installation position in the vehicle EGO. In the simulation model, the two virtual mono cameras film the virtual surroundings of the vehicle EGO. One of the two mono cameras generates the first image data B1 therefrom, and the other of the two mono cameras generates the second image data B2 therefrom. The synthetic image data B1, B2 thus simulate a detection by the stereo camera 12 of a region of a virtual surroundings 30 of the vehicle EGO.

A combiner 24 of the computing unit 20 is configured to compose the two image data sets B1, B2 in such a way that they are displayed as two channels of a stereo image when output on the autostereoscopic screen 18. The first and second image data B1, B2 are simultaneously output on the autostereoscopic screen 18. The stereo camera 12 is arranged in front of the screen 18 in such a way that it detects the first image data B1 with its first optics 14 and can detect the second image data B2 with its second optics 16, and that these first and second image data B1, B2 can be combined to form a stereo image. The first and second image data can be combined, for example, in a processor of the stereo camera 12 and/or in a further processor arranged outside the stereo camera 12. The correct distance between the stereo camera 12 and the screen 18 depends, for example, upon the resolution and/or size of the screen, and/or upon the configuration of the lenticular grid or parallax barrier. In addition, the configuration of the stereo camera 12 is to be taken into account—in particular, the distance between the two lenses 14, 16. A typical distance of the stereo camera 12 from the screen 18 depends upon the size of the screen and can, for example, be between 50 cm and 200 cm—in particular, between 70 cm and 80 cm, and in particular about 74 cm.

The stereo camera 12 can have an interface for outputting digital image data. The digital image data can, for example, be raw data or data which have already been processed by the processor of the stereo camera 12. The test setup 10, and in particular the computing unit 20, can have an interface for receiving data. For example, the image data detected by the stereo camera 12 and output via its interface can be received via the interface of the test setup 10 and processed further, for example, in the computing unit 20.

Figure 2:
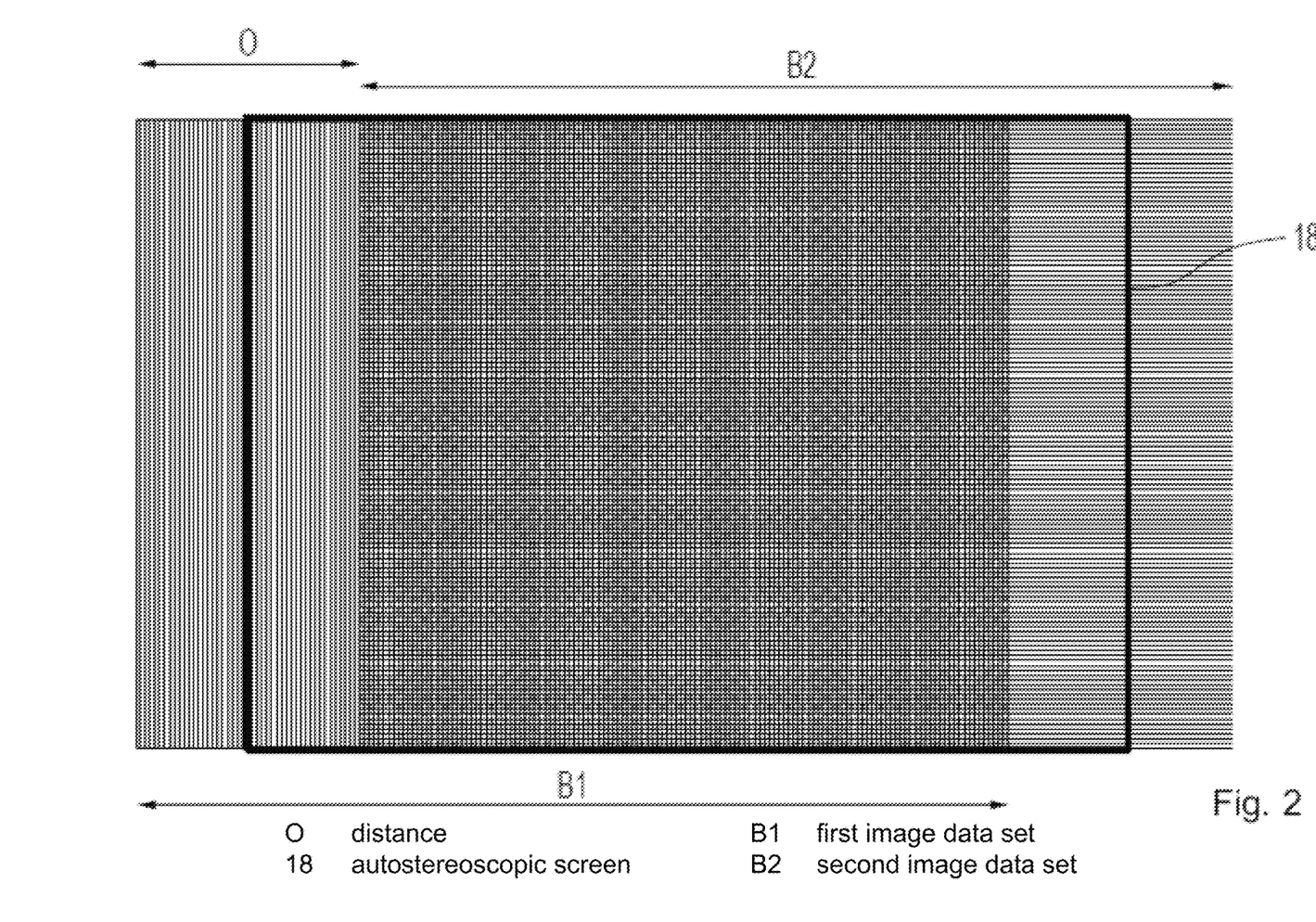
FIG. 2 schematically shows an offset of first and second image data.

FIG. 2 schematically shows how the first and second image data B1, B2 are output with an offset O relative to one another on the screen 18. The offset O corresponds thereby to the distance O of the two stereo camera lenses 14, 16.

The autostereoscopic screen 18 is configured to simultaneously output the synthetic image data as first and second image data B1, B2 as combined image data, as shown in FIG. 2. The autostereoscopic screen 18 has devices on its surface which spatially separate the light generated by the pixels (depending upon whether the generating pixel belongs to the first or to the second image data) and redirect it and/or let it through in the direction of the first or of the second lens 14, 16. On the surface of the screen 18, in this context, means after the light generation by the pixel in the direction of the beam direction.

In particular, the devices mounted on the screen surface can be designed as lenticular grids and/or parallax barriers. The lenticular grid redirects the light beam through lenses. Via obliquely positioned aperture grilles, the parallax barrier can pass light from pixels which represent the first image data B1 in the direction of the first lens 14 and light from pixels which represent the second image data B2 in the direction of the second lens 16.

Figure 3:
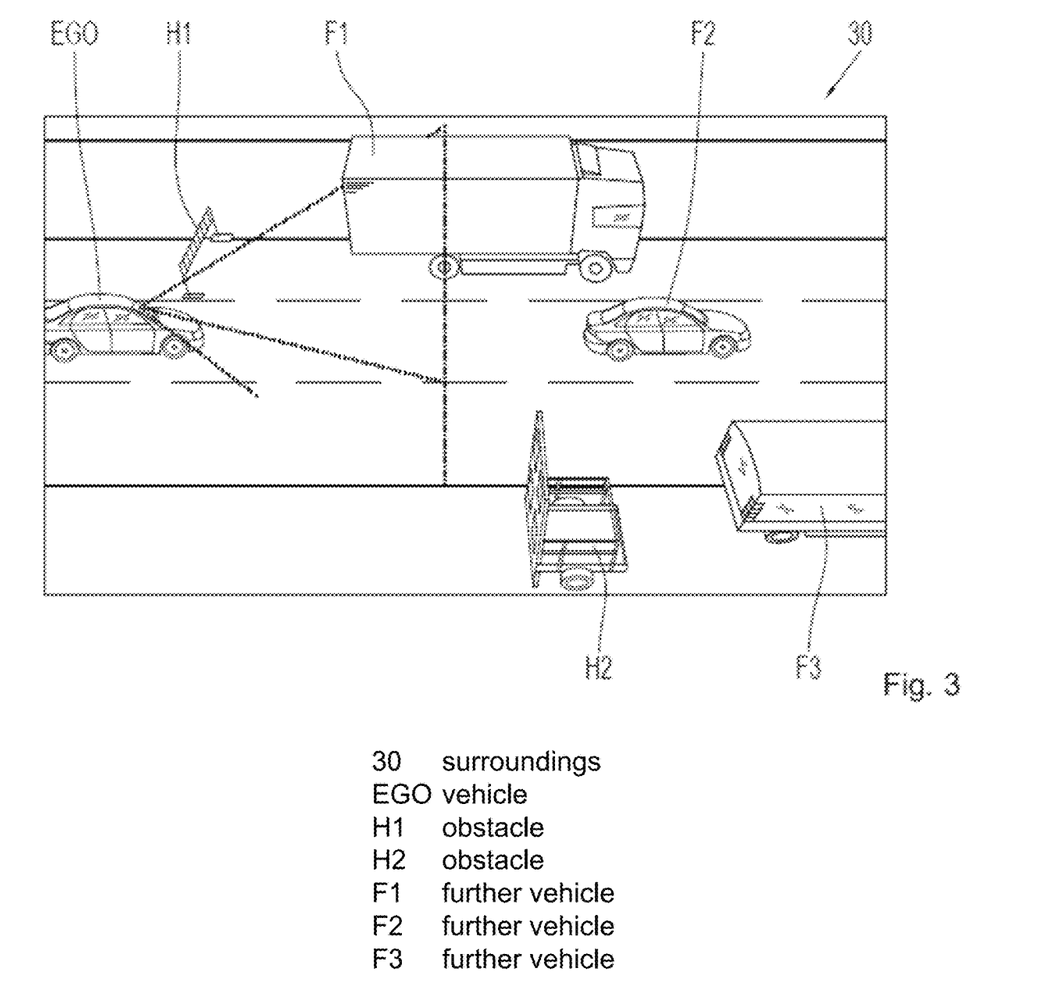
FIG. 3 schematically shows an example of surroundings of a vehicle.

FIG. 3 shows an example of a stereo image of a region of a surroundings 30—a scene of the surroundings—of the vehicle EGO. This scene can be generated by the simulator 22, e.g., in the context of the simulation model, as virtual surroundings.

The vehicle EGO is in a driving situation with objects in the surroundings, such as three further vehicles F1, F2, F3 and two obstacles H1, H2. Depth information—in particular, distances of the vehicle EGO from surrounding objects—can be determined on the basis of the stereo image. The first and second image data B1, B2 were generated using this depth information. In the test setup, the synthetic first and second image data B1, B2 are generated and output on the autostereoscopic screen 18 in such a way that the depth information can be determined on the basis of the stereo image detected by the stereo camera 12. One possibility for the functional testing of the stereo camera 12 is therefore to compare whether the depth information corresponds to the depth information used in the generation of the stereo image.

Figure 4:
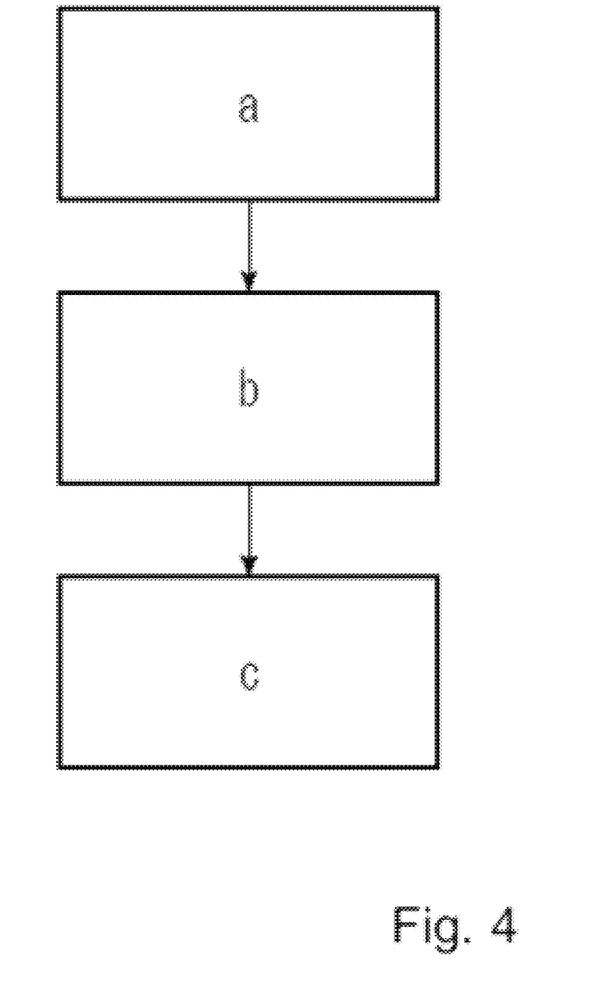
FIG. 4 schematically shows a method for testing a stereo camera.

FIG. 4 schematically shows a method for testing the stereo camera 12, with the steps of:
a) generating synthetic image data B1, B2, b) outputting the synthetic image data B1, B2 on an autostereoscopic screen 18, c) detecting the image data, output on the screen 18, by the stereo camera 12 as a stereo image.

Preferably, in the method in step a), first and second synthetic image data B1, B2 for the stereo image are generated and output simultaneously on the autostereoscopic screen 18. This is, for example, possible in the case of autostereoscopic screens 18, which, via devices mounted on the screen, enable the redirecting or letting through or not letting through of the respective image data in the direction of one of the optics of the stereo camera 12 in each case.

This makes it possible for the first image data B1 to be detected by the first optics 14 of the stereo camera 12, e.g., by associated light beams being redirected by lenses of the lenticular grid in the direction of the first optics 14 or being let through the parallax barrier in the direction of the first optics 14. At the same time, it is made possible for the first image data B1 to not be detected by the second optics 16 of the stereo camera 12 because, for example, the associated light beams are guided away from the second optics 18 by lenses of the lenticular grid or are blocked by the parallax barrier. At the same time, it is made possible for the second image data B2 to be detected by second optics 16 of the stereo camera 12, e.g., by associated light beams being redirected by lenses of the lenticular grid in the direction of the second optics 16 or by being let through the parallax barrier in the direction of the second optics 16. At the same time, it is made possible for the second image data B2 to not be detected by the first optics 16 of the stereo camera 12 because, for example, the associated light beams are guided away from the first optics 16 by lenses of the lenticular grid or blocked by the parallax barrier.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A test setup for testing a stereo camera for a vehicle, wherein the test setup comprises:
   a computing unit; and
   an autostereoscopic screen;
   wherein the computing unit is configured to generate synthetic image data and to output the synthetic image data on the autostereoscopic screen in such a way that the image data is detectable by the stereo camera as a stereo image;
   wherein the stereo camera comprises first optics and second optics disposed at a distance from one another; and
   wherein generating the synthetic image data is based on a simulation model that simulates vehicle surroundings, including a plurality of objects in the vehicle surroundings, and wherein in the simulation model, an ego vehicle comprises a virtual stereo camera having two virtual mono cameras at the same distance from one another as the first and second optics of the stereo camera;
   wherein the synthetic image data output on the autostereoscopic screen includes first image data corresponding to the first optics and second image data corresponding to the second optics, and wherein the first image data and the second image data are simultaneously output;
   wherein the test setup is part of a test bench for testing the vehicle; and
   wherein the vehicle has a radar sensor, an ultrasonic sensor, a further camera, and/or a LIDAR sensor, and the test bench has a further test setup for testing the radar sensor, the ultrasonic sensor, the further camera, and/or the LIDAR sensor.

2. The test setup according to claim 1, wherein the autostereoscopic screen is configured to generate a stereo effect on a pixel basis and via devices mounted on the screen surface.

3. The test setup according to claim 2, wherein the devices mounted on the screen surface are designed as lenticular grids and/or parallax barriers.

4. The test setup according to claim 1, wherein the autostereoscopic screen is configured to spatially separate the first and second image data on a pixel basis and via devices mounted on the screen surface.

5. The test setup according to claim 4, wherein the devices mounted on the screen surface are designed as lenticular grids and/or parallax barriers.

6. The test setup according to claim 4, wherein, from the simultaneously output first and second image data, the first image data is detectable by the first optics of the stereo camera, and the second image data is detectable by the second optics of the stereo camera.

7. The test setup according to claim 6, wherein the computing unit is configured to generate the synthetic image data using parameters of the stereo camera.

8. The test setup according to claim 1, wherein depth information is determinable on the basis of the stereo image.

9. The test setup according to claim 1, wherein the computing unit is configured to generate the synthetic image data and to output the synthetic image data on the autostereoscopic screen in such a way that depth information is determinable based on the stereo image detected by the stereo camera.

10. The test setup according to claim 1, wherein the test setup has an interface for receiving data which are dependent upon the image data detected by the stereo camera.

11. A method for testing a stereo camera of a vehicle, wherein the stereo camera comprises first optics and second optics disposed at a distance O from one another, the method comprising:

a) generating, by a test setup, synthetic image data, wherein generating the synthetic image data is based on a simulation model that simulates vehicle surroundings, including a plurality of objects in the vehicle surroundings, and wherein in the simulation model, an ego vehicle comprises a virtual stereo camera having two virtual mono cameras at the same distance from one another as the first and second optics of the stereo camera;

b) outputting, by the test setup, the synthetic image data on an autostereoscopic screen; and c) detecting, by the stereo camera, the synthetic image data output on the screen as a stereo image;

wherein the synthetic image data output on the autostereoscopic screen includes first image data corresponding to the first optics and second image data corresponding to the second optics, and wherein the first image data and the second image data are simultaneously output;

wherein the test setup is part of a test bench for testing the vehicle; and wherein the vehicle has a radar sensor, an ultrasonic sensor, a further camera, and/or a LIDAR sensor, and the test bench has a further test setup for testing the radar sensor, the ultrasonic sensor, the further camera, and/or the LIDAR sensor.

* * * * *